United States Patent
Kolarczyk et al.

(10) Patent No.: US 7,191,851 B2
(45) Date of Patent: Mar. 20, 2007

(54) UNATTENDED GROUND SENSOR ASSEMBLY

(75) Inventors: Jerome C. Kolarczyk, Crystal Lake, IL (US); Joseph J. Wisniewski, Ringwood, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/320,190

(22) Filed: Dec. 28, 2005

(65) Prior Publication Data

US 2006/0213290 A1    Sep. 28, 2006

Related U.S. Application Data

(62) Division of application No. 10/766,069, filed on Jan. 28, 2004, now Pat. No. 7,013,745.

(51) Int. Cl.
    *E21B 49/00*    (2006.01)
(52) U.S. Cl. ................ 175/50; 73/866.5; 175/57
(58) Field of Classification Search ............ 175/50, 175/57; 73/866.5, 661; 324/330–331; 244/3.24; 340/551, 556
    See application file for complete search history.

(56) References Cited

U.S. PATENT DOCUMENTS

| | | | |
|---|---|---|---|
| 1,400,803 A | 12/1921 | Colan, Jr. ............ | 439/230 |
| 2,700,140 A | 1/1955 | Phillips ............ | 439/270 |
| 3,210,990 A | 10/1965 | Cantrell ............ | 73/84 |
| 5,080,305 A | 1/1992 | Stencel et al. ............ | 244/152 |
| 5,497,705 A | 3/1996 | Brey et al. ............ | 102/427 |
| 6,392,213 B1 | 5/2002 | Martorana et al. ............ | 244/3.1 |
| 6,978,967 B1 * | 12/2005 | Scheper et al. ............ | 244/3.24 |
| 6,981,672 B2 * | 1/2006 | Clancy et al. ............ | 244/3.24 |

* cited by examiner

*Primary Examiner*—Thomas P. Noland
(74) *Attorney, Agent, or Firm*—Stetina Brunda Garred & Brucker

(57) ABSTRACT

There is provided a ground sensor assembly adapted for deployment from air to a selected ground location. The ground sensor assembly comprises an aerially deployable sensor housing which has upper and lower housing ends defining a longitudinally elongated aperture therebetween. A plurality of connected sensor modules are longitudinally inserted into the aperture between the upper and lower housing ends. Furthermore, an aerodynamic module is connected to the sensor modules and is disposed adjacent the upper housing end outside the aperture. This aerodynamic module has a plurality of stabilizers which radially extend outward therefrom and form a generally parallel relationship with the upper housing end. Such stabilizers provide aerodynamic stability during the deployment of the ground sensor assembly from the air to the selected ground location.

10 Claims, 2 Drawing Sheets

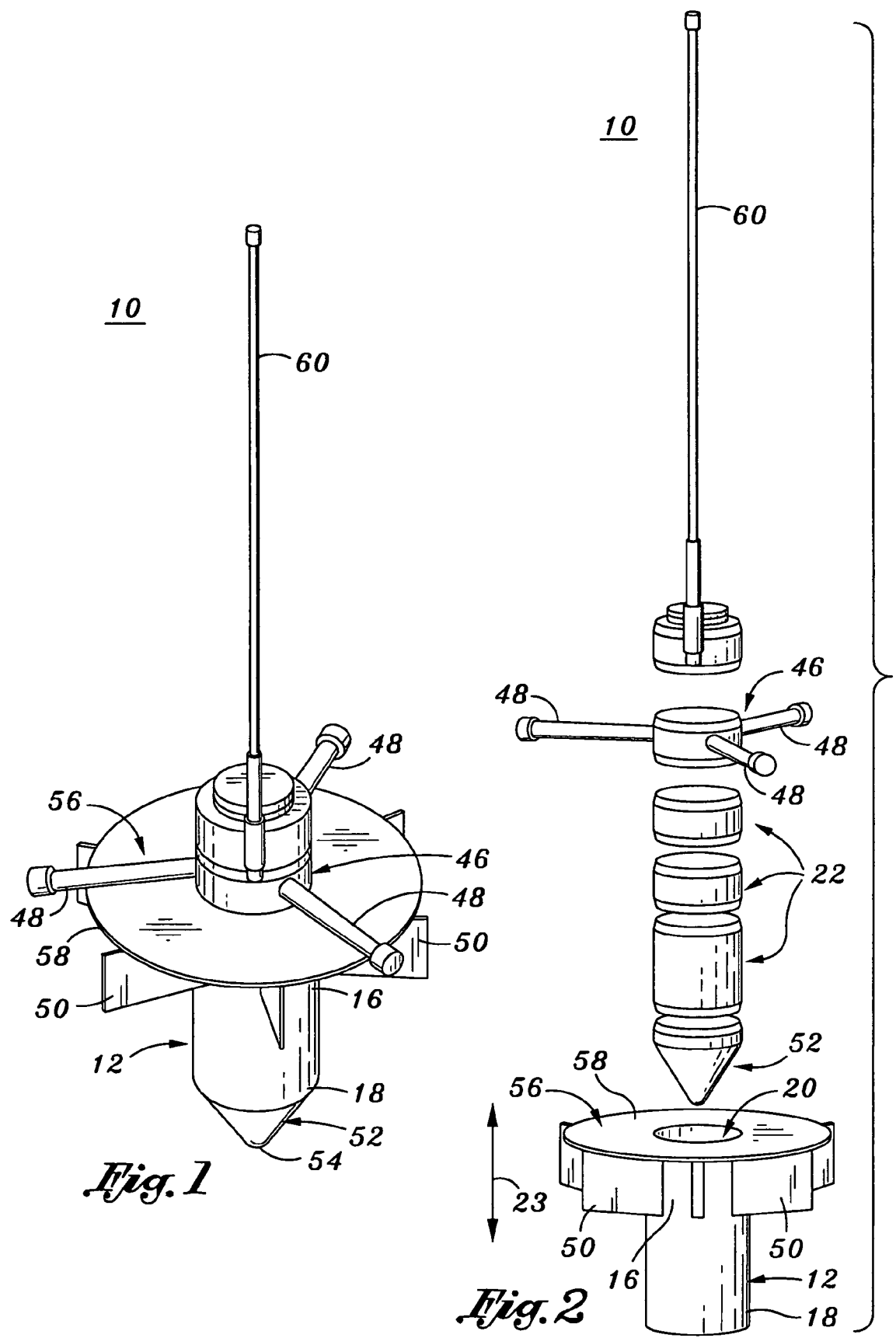

UNATTENDED GROUND SENSOR ASSEMBLY

CROSS-REFERENCE TO RELATED APPLICATIONS

This application is a divisional application of parent application Ser. No. 10/766,069, filed Jan. 28, 2004 now U.S. Pat. No. 7,013,745.

STATEMENT RE: FEDERALLY SPONSORED RESEARCH/DEVELOPMENT

This invention was made with Government support under N66001-98-C-8518 awarded by the Department of the Navy. The Government has certain rights to this invention.

BACKGROUND OF THE INVENTION

The present invention relates generally to ground sensors, and more particularly to an improved ground sensor assembly which is aerially deployable to a precise ground location through the use of its radially extending stabilizers to position a plurality of longitudinally stacked sensor modules thereat.

The use of ground sensors for conducting surveillance activities have been known for years. These sensors are typically designed to perform specific functions such as gathering intelligence data in regards to magnetic field activities, seismic activities or acoustic activities of a particular ground location. The ground sensors would relay the gathered data back to the field command unit for analysis and use in various field operations.

In the past, the ground sensors generally required human presence at the ground location to be surveyed for their operations. However, they have evolved over the years to operate without the need for any human interaction at such ground location. Once positioned at the targeted ground location, the ground sensors are automatically set up to monitor therearound and collect field data for relay of the same to the command unit.

Although the ground sensors may be delivered to the targeted ground location through various means, they are typically deployed from the air from an aircraft, for example, to the ground location. Such means of delivery is not only efficient but especially useful when the ground location to be targeted and surveyed is situated within an enemy or unfriendly territory.

Pinpoint accuracy of their placement is a must given that the desired peripheral surveillance of the ground location may be compromised if the ground sensors become displaced to even the slightest degree. However, by the nature of their design, many ground sensors commonly become altered in direction during their aerial deployment toward the targeted ground location. In this regard, optimal peripheral surveillance were oftentimes not achieved which led to unsought compromises in the overall field operation.

Furthermore, the aerially-deployable ground sensors are essentially designed and built to conduct a specific mission of gathering either magnetic field, seismic or acoustic data. These ground sensors are generally custom made for one particular surveillance activity and are not typically interchangeable with any other types of surveillance activity.

As such, multiple ground sensors must be manufactured in order to conduct various forms of surveillance activities. In this respect, the financial costs and manufacturing time associated with constructing different versions of the narrowly-focused ground sensor may become burdensome and extensive.

Thus, there has long been a need in the industry, and in the aerospace industry in particular, for a ground sensor which is designed to be unalterable in direction during its aerial deployment towards a precise ground target. In addition, there is a need for a ground sensor which is adapted to perform various forms of surveillance activities as opposed to one specific one so as to eliminate the need for multiple versions of the same therefor.

The present invention addresses and overcomes the above-described deficiencies by providing a ground sensor assembly which utilizes a plurality of radially extending stabilizers for stabilization during its aerial deployment to a precise ground location. Further to such innovative design feature, the ground sensor assembly of the present invention includes a plurality of sensor modules therewithin which can be selectively chosen and interlocked to each other in a longitudinal stack formation depending upon the particular surveillance activity or activities at hand. In this respect, not only can the ground sensor assembly of the present invention be accurately deployed, but it also eliminates the need to build and resort to multiple ground sensors for performing various forms of surveillance activities.

BRIEF SUMMARY OF THE INVENTION

In accordance with the present invention, there is provided a ground sensor assembly adapted for deployment from air to a selected ground location. The ground sensor assembly comprises an aerially deployable sensor housing which has upper and lower housing ends. These two housing ends define a longitudinally elongated aperture therebetween. A plurality of connected sensor modules may be longitudinally inserted into the aperture between the upper and lower housing ends.

Furthermore, an aerodynamic module may be connected to the sensor modules and be disposed adjacent the upper housing end outside the aperture. This aerodynamic module has a plurality of stabilizers which radially extend outward therefrom and form a generally parallel relationship with the upper housing end. Such stabilizers provide aerodynamic stability during the deployment of the ground sensor assembly from the air to the selected ground location.

More specifically, the sensor housing is preferably fabricated from a metallic material. In addition, a penetrating tip member may be connected to the sensor modules and be disposed adjacent the lower housing end outside the aperture. The penetrating tip member may form a penetrating tip for penetrating the selected ground location after being deployed from the air. In the preferred embodiment, the penetrating tip member has a conical configuration and is fabricated from a metallic material such as steel.

In accordance with the present invention, the sensor housing may comprise a plurality of aerial fins. The aerial fins may be formed adjacent the upper housing end and be radially extended outward therefrom. Preferably, there are four aerial fins formed to the upper housing end. By such configuration, the aerial fins may provide aerodynamic guidance when the ground sensor assembly is deployed from the air to the selected ground location.

Moreover, a stop plate may be disposed between the aerodynamic module and the upper housing end. The stop plate may be outwardly extended in a generally parallel relationship with respect to the stabilizers. The stop plate is primarily utilized for controlling the ground sensor assembly into a controlled depth when penetrating the selected ground location. More specifically, the stop plate is designed to mitigate the penetration of the sensor housing to expose the antenna above the selected ground location. The antenna may be located to extend above the aerodynamic module away from the upper housing end of the sensor housing. In the preferred embodiment, the stop plate has a generally circular configuration and defines a plate edge in which each of the stabilizers are extended therebeyond.

In accordance with the present invention, the sensor modules may be selected from the group consisting of a magnetic sensor, a seismic sensor, an acoustic sensor and combinations thereof. In the preferred embodiment, the sensor modules are axially interlocked to each other in a stack formation along the longitudinal axis of the sensor housing. Each of the sensor modules comprise a main module body, a collar and a capture ring. The main module body and the capture ring may be engaged to each other in a manner as to secure the collar therebetween. The collar may be freely rotatable between the main module body and the capture ring.

In particular, the main module body has a main base end defining a main threaded portion externally therearound, whereas the collar has a collar top end defining a collar threaded portion internally therearound. The collar top end may be extended over the capture ring. This is so that the collar threaded portion can threadably engage the main threaded portion of an adjacent main module body.

Additionally, the main module body has at least one main hole. The capture ring has at least one capture hole. The main and capture hole(s) are preferably elongated along a same direction as the aperture of the sensor housing. The capture hole(s) may be aligned with the main hole(s) of an adjacent main module body and be sized and configured to be secured in position. This is to prevent the sensor modules from rotating with respect to each other.

In the preferred embodiment, each of the stabilizers are fabricated from a metallic material and have an elongated rod configuration. Further preferably, there are three stabilizers radially extending outward from the aerodynamic module.

BRIEF DESCRIPTION OF THE DRAWINGS

These as well as other features of the present invention will become more apparent upon reference to the drawings wherein:

FIG. 1 is a perspective view of an aerially-deployable ground sensor assembly constructed in accordance with a preferred embodiment of the present invention and including a plurality of stabilizers which radially extend outward therefrom;

FIG. 2 is a perspective exploded view of the ground sensor assembly shown in FIG. 1 and illustrating its sensor housing which is adapted to accommodate a plurality of stacked modules longitudinally therewithin.

DETAILED DESCRIPTION OF THE INVENTION

Figure 3:
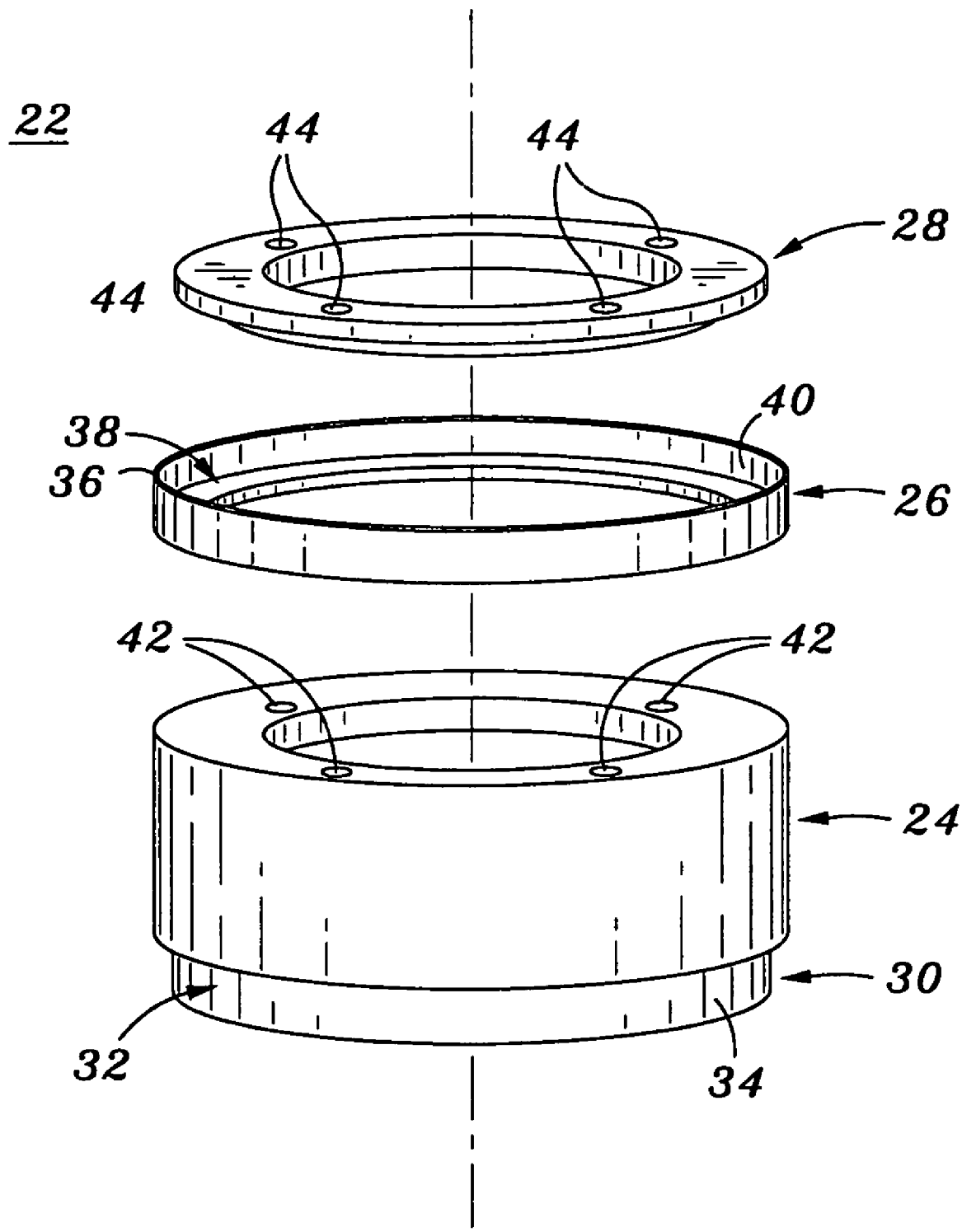
FIG. 3 is a perspective exploded view of one of the stacked modules shown in FIG. 2 and illustrating its main module body and capture ring which secure a freely rotatable collar therebetween.

Referring now to the drawings wherein the showings are for purposes of illustrating preferred embodiments of the present invention only, and not for purposes of limiting the same, FIG. 1 perspectively illustrates a ground sensor assembly 10 constructed in accordance with a preferred embodiment of the present invention. The ground sensor assembly 10 is designed to maintain stable course of direction during its aerial deployment and be selectively configurable to perform various forms of surveillance activities ranging from magnetic field, seismic and/or acoustic surveillance.

The ground sensor assembly 10 may be formed to have a variety of shapes, configurations, geometries and textures which produce suitable aerodynamics during its deployment from air to a targeted ground location (not shown). It should be noted herein that the ground sensor assembly 10 may be deployed from any aerial object such as an aircraft or be launched into the air by launching mechanisms such as a rocket or a cannon. Alternatively, a person of ordinary skill in the art will foresee that the ground sensor assembly 10 may be hand-placed at a specific site of the target ground location in lieu of aerial deployment.

Referring now to FIGS. 1 and 2, as the ground sensor assembly 10 may be any general desired shape it is understood that the ground sensor assembly 10 as depicted is symbolic in nature. However, the ground sensor assembly 10 of the present invention features a sensor housing 12 which is elongated in a cylindrical-like configuration. Although this sensor housing 12 may be fabricated from any rigid material that can withstand the impact of hitting the selected ground location, it is preferably constructed from a metallic material. The sensor housing 12 has an upper housing end 16 and a lower housing end 18 wherein an aperture 20 is longitudinally elongated along the sensor housing 12 therebetween.

Referring more particularly to FIGS. 2 and 3, a plurality of sensor modules 22 are provided with the ground sensor assembly 10 of the present invention for the purpose of conducting various forms of surveillance activities about the targeted ground location. The sensor modules 22 are chosen from a group comprising of a magnetic sensor, a seismic sensor and/or an acoustic sensor. More specifically, one or more types of those sensors may be selectively utilized to conduct one or more forms of surveillance activities corresponding to the selected sensor. For example, if only one surveillance task is needed for a particular mission, then only one specific type of sensor is utilized with the ground sensor assembly 10. However, if multiple surveillance tasks are desired for the mission, then different types of sensors may be fitted together to take on the multiple tasks.

As illustrated in FIG. 2, the sensor modules 22 are placed within the sensor housing 12 in a very specific manner. More particularly, these sensor modules 22 are connected to each other in a manner as to be inserted and fit within the longitudinal aperture 20 of the sensor housing 12. Furthermore, it is preferred that the sensor modules 22 become substantially contained between the upper and lower housing ends 16, 18 when positioned within the aperture 20.

In order to satisfy such specification, it is preferred that the sensor modules 22 are axially interlocked to each other in a stack formation..along a longitudinal axis of the sensor housing 12 to conform to the elongated longitudinal spacing of the aperture 20. To derive the stack formation of the modules 22, certain portion of each module 22 are engaged to a complimentary portion of its adjacent module 22 to thereby define the stack configuration.

Referring now back to FIG. 3, each of the sensor modules 22 are composed of a main module body 24, a collar 26 and a capture ring 28. In each of the modules 22, the main module body 24 and the capture ring 28 are engaged to each other and collectively secure the collar 26 therebetween. The main module body 24 and the capture ring 28 maintains the securement of the collar 26 therebetween but provides some clearance to allow the collar 26 to spin or rotate freely. In essence, each sensor module 22 utilized in the ground sensor assembly 10 of the present invention follows this manner of construction.

Each main module body 24 has a main base end 30 which is disposed away from its capture ring 28. This main base end 30 defines an external surface 32 that forms a main threaded portion 34 therearound. In addition, the collar 26 has a collar top end 36 which is sized and configured to extend over its capture ring 28 away from its main module body 24. The collar top end 36 defines an internal surface 38, in which a collar threaded portion 40 is formed therearound.

With the particular features of the sensor modules 22 clarified, the way in which sensor stack formation is formed could now be described. More particularly, the collar top end 36 of a chosen sensor module 22 is placed over the main base end 30 of an adjacent sensor module so that the internal surface 38 thereof is abutted against the external surface 32 of the adjacent sensor module's main base end 30. They are designed to be complimentary so that the collar threaded portion 40 and the main threaded portion 34 can be threadably engaged to each other. This operates to engage the two sensor modules 22 together in which such process may be repeated to form the desired sensor stack configuration.

In addition to interlocking and stacking the sensor modules 22 together, the sensor modules 22 should be prevented from rotating with respect to each other. To accomplish such end, a number of main holes 42 are formed through each of the main module body 24. A corresponding number of capture holes 44 are also formed through each of the capture ring 28. In the preferred embodiment, the main and capture holes 42, 44 are elongated along the same direction of extension as the aperture 20 of the sensor housing 12. The capture holes 42 of a particular sensor module 22 may be placed in alignment with the main holes 44 of an adjacent sensor module 22 for fixed positioning. Although other measures may be used, it is preferred that guide pins (not shown) are inserted into the capture holes 44 and through the main holes 42 of the next adjacent sensor module 22. This should prevent the spinning of the sensor modules 22 relative to each other as the collar 26 is preferably tightened via a spanner wrench, for example. Optionally, gaskets (not shown) may be used between the main module body 24 and the capture ring 28 to environmentally seal each individual module and to draw one module 22 into contact with the other.

Because the sensor modules 22 are not allowed to spin with respect to each other, standard electrical connections may be used. This simplifies the overall design of the ground sensor assembly 10 since slip ring connections or extended wire lengths are not needed to account for the rotation of the sensor modules 22. Such design is further advantageous over its predecessors because it also allows for ease of removal or addition of modules 22. The assembly chain can be broken in any location without requiring disassembly of the entire configuration for access to any individual module. In this respect, grouping of different types of sensors 22 to monitor numerous phenomena such as seismic activities, acoustic disturbances and magnetic fields can be greatly facilitated. Furthermore, the commonality of both mechanical and electrical parts among the different types of sensor modules 22 will also significantly reduce the overall manufacturing costs and time.

Referring now to FIGS. 1 and 2, an aerodynamic module 46 is connected to the sensor modules 22 in the same manner as described above. However, the positioning of the aerodynamic module 46 is specific in that it is disposed adjacent the upper housing end 16 of the sensor housing 12 outside its aperture 20. Preferably, only the sensor modules 22 are contained within the aperture 20. This aerodynamic module 46 has a plurality of stabilizers 48 which are used for providing aerodynamic stability during the aerial deployment of the ground sensor assembly 10.

More specifically, the stabilizers 48 are adapted to stabilize the ground sensor assembly 10 during its free fall towards the selected ground location. To accomplish such task, the stabilizers 48 are designed to radially extend outward from the aerodynamic module 46 while forming a generally parallel relationship with respect to the upper housing end 16 of the sensor housing 12. In the preferred embodiment, the ground sensor assembly 10 comprises three stabilizers 48, of which each stabilizer 48 has an elongated rod configuration and is fabricated from a metallic material.

The ground sensor assembly 10 of the present invention further comprises a plurality of aerial fins 50 for guiding the assembly 10 towards the selected ground location when being deployed from the air. These aerial fins 50 are preferably formed adjacent to the upper housing end 16 of the sensor housing 12 and radially extend outward therefrom. Preferably, four aerial fins 50 are used with the present ground sensor assembly 10.

There is also provided a penetrating tip member 52 for penetrating the selected ground location after its free fall thereto. In particular, the penetrating tip member 52 is attached to the sensor modules 22 adjacent the lower housing end 18 of the sensor housing 12 outside its aperture 20. The penetrating tip member 52 defines a penetrating tip 54 opposite from its attachment to the sensor modules 22. The tip 54 is the portion which first penetrates the ground location. In the preferred embodiment, the penetrating tip member 52 has a conical configuration and is fabricated from a metallic material such as steel. Of course, if one wishes to hand-place the ground sensor assembly 10 as opposed to deploying it from the air, the penetrating tip member 52 may be optionally eliminated from the overall design.

A stop plate 56 is provided between the aerodynamic module 54 and the upper housing end 16 of the sensor housing 12. The stop plate 56 is primarily designed for controlling the penetration of the ground sensor assembly 10 into the selected ground location. This stop plate 56 preferably has a generally circular configuration wherein it extends outwardly in a generally parallel relationship with respect to the stabilizers 48. It should be noted herein that the stabilizers 48 extend out beyond the edges 58 of the stop plate 56.

The stop plate 56 is adapted to mitigate or stop the penetration of the ground sensor assembly 10 so as to expose at least a portion of the antenna 60 above the selected ground location. As shown in FIGS. 1 and 2, the antenna 60 is extended above the aerodynamic module 54 away from the upper housing end 16 of the sensor housing 12. Similar to the penetrating tip member 52, the stop plate 56 may be removed from the overall design if the ground sensor assembly 10 is intended to be hand-placed.

The ground sensor assembly 10 of the present invention may use a battery or a battery pack (not shown) as its power source. However, if a longer life battery configuration is desired, the battery or battery pack may be removed and replaced by a cap assembly (not shown) adapted to be fitted with a power cord. This may then be connected to an external battery of larger capacity which would be camouflaged above the ground location or buried nearby.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method of deploying a ground sensor assembly having an antenna from air to a selected ground location, the method comprising the steps of:
   a) releasing the ground sensor assembly having a penetrating tip member, a stop plate, an antenna, an upper housing end and a plurality of stabilizers from the air;
   b) directing the ground sensor assembly towards the selected ground location;
   c) stabilizing the ground sensor assembly with the stabilizers radially extending in a generally parallel relationship with respect to the upper housing end;
   d) penetrating the selected ground location with the penetrating tip member to a controlled depth with the ground sensor assembly;
   (e) mitigating the penetration of the ground sensor assembly with the stop plate to expose the antenna above the selected ground location; and
   f) performing a sensing activity of the selected ground location.

2. The method of claim 1 wherein step b) comprises:
   1) defining a plurality of aerial fins radially extending outward from the upper housing end; and
   2) guiding the ground sensor assembly in the air toward the selected ground location with the aerial fins.

3. The method of claim 1 wherein each of the stabilizers in step c) have an elongated rod configuration.

4. The method of claim 1 wherein step f) comprises:
   1) defining a plurality of sensor modules inserted within the ground sensor assembly in a stack formation; and
   2) sensing the selected ground location with the sensor modules.

5. The method of claim 4 wherein the sensor modules are selected from the group consisting of a magnetic sensor, a seismic sensor, an acoustic sensor and combinations thereof.

6. A method of deploying a ground sensor assembly from air to a selected ground location, the method comprising the steps of:
   a) defining a plurality of sensor modules inserted within the ground sensor assembly in a stack formation;
   b) releasing the ground sensor assembly having an upper housing end and a plurality of stabilizers from the air;
   c) directing the ground sensor assembly towards the selected ground location;
   d) stabilizing the ground sensor assembly with the stabilizers radially extending in a generally parallel relationship with respect to the upper housing end;
   e) penetrating the selected ground location to a controlled depth with the ground sensor assembly; and
   f) sensing the selected ground location with the sensor modules.

7. The method of claim 6 wherein step c) comprises:
   1) defining a plurality of aerial fins radially extending outward from the upper housing end; and
   2) guiding the ground sensor assembly in the air toward the selected ground location with the aerial fins.

8. The method of claim 6 wherein each of the stabilizers in step d) have an elongated rod configuration.

9. The method of claim 6, wherein step e) comprises:
   1) defining a penetrating tip member, a stop plate and an antenna of the ground sensor assembly;
   2) penetrating the selected ground location with the penetrating tip member; and
   3) mitigating the penetration of the ground sensor assembly with the stop plate to expose the antenna above the selected ground location.

10. The method of claim 6 wherein the sensor modules are selected from the group consisting of a magnetic sensor, a seismic sensor, an acoustic sensor and combinations thereof.

* * * * *